(12) United States Patent
Warpinski et al.

(10) Patent No.: US 10,920,580 B2
(45) Date of Patent: Feb. 16, 2021

(54) REAL-TIME BOTTOM-HOLE FLOW MEASUREMENTS FOR HYDRAULIC FRACTURING WITH A DOPPLER SENSOR IN BRIDGE PLUG USING DAS COMMUNICATION

(71) Applicant: Halliburton Energy Services, Inc., Houston, TX (US)

(72) Inventors: Norman R. Warpinski, Cypress, TX (US); Mikko Jaaskelainen, Katy, TX (US); Kenneth James Smith, Houston, TX (US); Brian Park, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 120 days.

(21) Appl. No.: 15/760,155

(22) PCT Filed: Dec. 16, 2015

(86) PCT No.: PCT/US2015/065970
§ 371 (c)(1),
(2) Date: Mar. 14, 2018

(87) PCT Pub. No.: WO2017/105426
PCT Pub. Date: Jun. 22, 2017

(65) Prior Publication Data
US 2018/0274360 A1   Sep. 27, 2018

(51) Int. Cl.
*E21B 47/107* (2012.01)
*E21B 47/07* (2012.01)
*E21B 47/113* (2012.01)
*E21B 47/135* (2012.01)
*E21B 33/12* (2006.01)
*E21B 43/267* (2006.01)
*E21B 47/06* (2012.01)
(Continued)

(52) U.S. Cl.
CPC ............ *E21B 47/107* (2020.05); *E21B 33/12* (2013.01); *E21B 43/267* (2013.01); *E21B 47/06* (2013.01); *E21B 47/07* (2020.05); *E21B 47/113* (2020.05); *E21B 47/135* (2020.05); *G01D 5/268* (2013.01); *G01F 1/663* (2013.01)

(58) Field of Classification Search
CPC .................................................. E21B 47/101
See application file for complete search history.

(56) References Cited

U.S. PATENT DOCUMENTS 6,634,425 B2   10/2003  King et al.
9,416,644 B2*  8/2016   McEwen-King ....... E21B 43/26
9,759,037 B2*  9/2017   Shampine ............. E21B 33/134
(Continued)

FOREIGN PATENT DOCUMENTS

WO        2012072981 A2    6/2012

OTHER PUBLICATIONS

PCT Application Serial No. PCT/US2015/065970, International Search Report, dated Sep. 9, 2016, 3 pages.
(Continued)

*Primary Examiner* — Steven A MacDonald
(74) *Attorney, Agent, or Firm* — Gilliam IP PLLC (57) ABSTRACT

A system and method for obtaining real time down hole flow measurements and proppant concentrations between perforations and/or perforation clusters during hydraulic fracturing in multistage stimulated wells.

19 Claims, 4 Drawing Sheets

(51) Int. Cl.
 *G01D 5/26* (2006.01)
 *G01F 1/66* (2006.01)

(56) References Cited

U.S. PATENT DOCUMENTS

| | | | | |
|---|---|---|---|---|
| 10,502,049 | B2* | 12/2019 | McEwen-King | E21B 49/00 |
| 2006/0102342 | A1* | 5/2006 | East | E21B 43/26 |
| | | | | 166/250.1 |
| 2013/0233537 | A1* | 9/2013 | McEwen-King | E21B 43/26 |
| | | | | 166/250.1 |
| 2014/0260589 | A1* | 9/2014 | Hallundæk et al. | E21B 47/101 |
| | | | | 73/152.32 |
| 2016/0348497 | A1* | 12/2016 | McEwen-King | E21B 43/26 |
| 2018/0073353 | A1* | 3/2018 | Malik | G01F 1/74 |
| 2018/0363451 | A1* | 12/2018 | Heijnen | E21B 47/101 |

OTHER PUBLICATIONS

PCT Application Serial No. PCT/US2015/065970, International Written Opinion, dated Sep. 9, 2016, 7 pages.
Canadian Application Serial No. 2,999,248; Examiner's Letter; Jan. 15, 2019, 5 pages.

\* cited by examiner

REAL-TIME BOTTOM-HOLE FLOW MEASUREMENTS FOR HYDRAULIC FRACTURING WITH A DOPPLER SENSOR IN BRIDGE PLUG USING DAS COMMUNICATION

BACKGROUND

This disclosure relates generally to a system and method for obtaining real time down hole flow measurements and proppant concentration between perforations and/or perforation clusters during hydraulic fracturing.

Fiber optic distributed sensing systems were developed in the 1980s to replace older measurement systems composed of multiple individual sensors.

Fiber optic distributed sensing systems are commonly based on Optical Time-Domain Reflectometry (OTDR) and utilizes techniques originally derived from telecommunications cable testing. Today fiber optic distributed sensing systems provides a cost-effective way of obtaining hundreds, or even thousands, of highly accurate, high-resolution measurements and today find widespread acceptance in industries such as oil and gas, electrical power, and process control.

Flow estimates based on DTS and DAS data in hydraulic fracturing may be inaccurate depending on flow regime and temperature effects during warm-back. It may also be a challenge to get real-time data with DAS and DTS based measurements as it may involve modeling that may require a fair amount of calculations. Location of perforation clusters, pump rates, fluid temperatures may also add uncertainty in measurements.

Downhole measurements can be very difficult because it is often not feasible to run wirelines or coiled tubing, nor is it easy to design a permanent system with downhole pressure gages and some means of data transmission up the casing (wired or fiber).

The systems and methods described herein address these needs.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

It is proposed to use a Doppler based flow sensor with power placed in the bridge plugs that are run downhole after each stage. The Doppler flow sensor will face up-hole so that it can record down-hole flow between perforations and/or perforation cluster during the pumping and also cross flow during the shut in period after the next plug has been set and the stage is isolated from adjacent stages. The means of communication will be a sound transmitted from the flow sensor that is picked up by using DAS technology in a fiber that is permanently deployed, such as that used in the electro acoustic technology. Electro acoustic technology, which will be described below, converts electric to acoustic energy, enables the use of many different frequency bands to transmit digital information over one fiber optic cable.

The Doppler based flow sensor will send out a pulse and measure reflections from that pulse over time. Time of flight may determine the location, and the Doppler shifted frequency may determine the flow rate, and the amplitude may provide information about the fluid/proppant concentration. The Doppler based flow sensor may operate at several different frequencies, where some frequencies may see less of attenuation due to particles and/or composition of the fluid.

Because this Doppler based flow sensing technology is proposed to work in conjunction with electro acoustic technology (EAT), a recently developed innovation, it is appropriate to begin with a discussion of that technology.

Description of EAT (Electro Acoustic Technology) Sensors

The EAT sensors and EAT sensing technology described in this disclosure is a recently developed technology and has been described in a recently published PCT application: WO2015020642A1.

EAT Sensors represent a new approach to fiber optic sensing in which any number of downhole sensors, electronic or fiber optic based, can be utilized to make the basic parameter measurements, but all of the resulting information is converted at the measurement location into perturbations or a strain applied to an optical fiber cable that is connected to an interrogator that may be located at the surface of a downhole well. The interrogator may routinely fire optical signal pulses downhole into the optical fiber cable. As the pulses travel down the optical fiber cable back scattered light is generated and is received by the interrogator.

The perturbations or strains introduced to the optical fiber cable at the location of the various EAT sensors can alter the back propagation of light and those effected light propagations can then provide data with respect to the signal that generated the perturbations.

Figure 1:
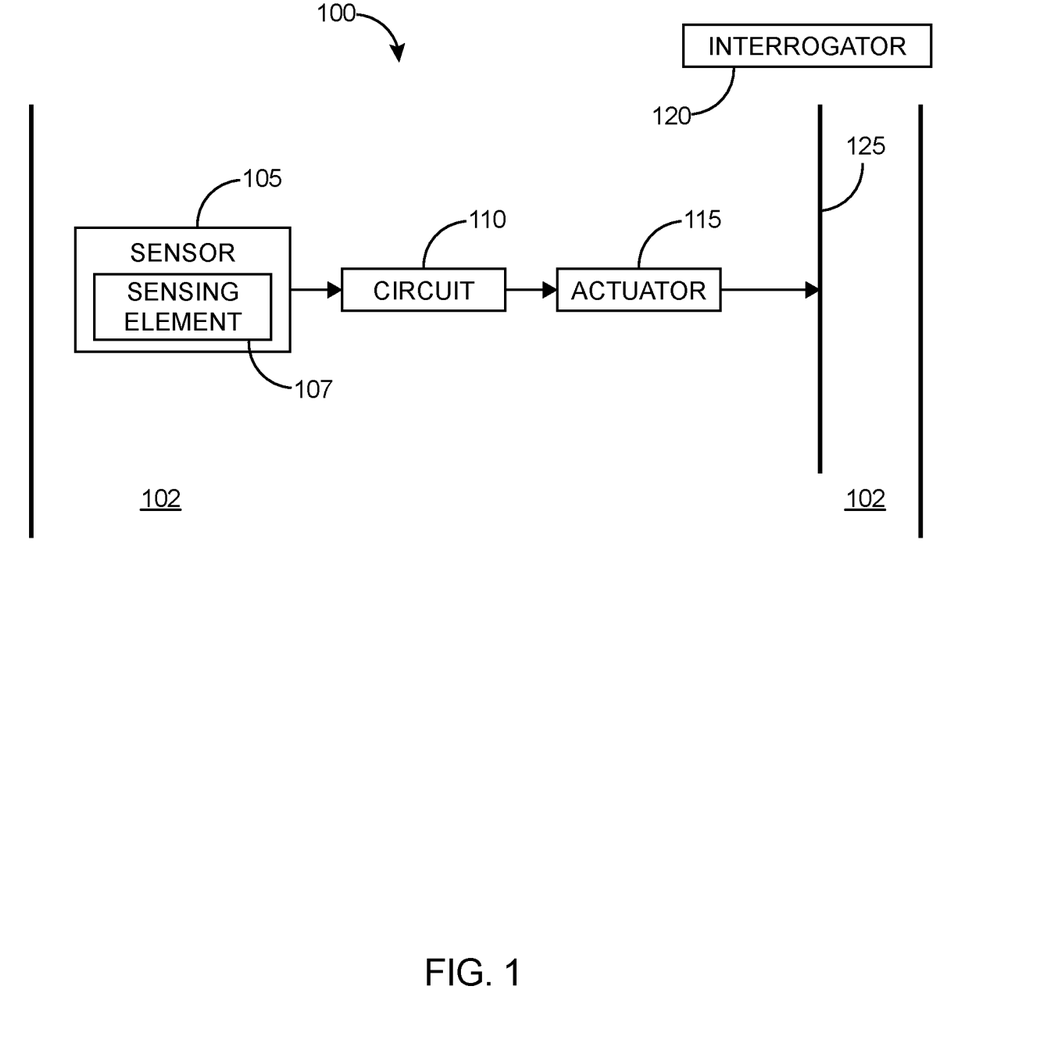
FIG. 1 illustrates the electro acoustic technology (EAT) concept for parameter monitoring.

The EAT sensor system can be best understood by reference to FIG. 1, which is an example embodiment of an EAT sensor system. System 100 can include a sensor 105, a circuit 110 coupled to the sensor 105, an actuator 115 coupled to the circuit 110, and an interrogator 120 located at the surface of a downhole system. The sensor 105 is operable to provide a measurement corresponding to a parameter at a location in a region 102. The sensor 105 can be realized in a number of different ways depending on the parameter to be determined by the measurement using the sensor 105. The parameter can include, but is not limited to, a chemical concentration, a pH, a temperature, a vibration, or a pressure. The sensor 105 has the capability of being disposed at a location in proximity of an optical fiber cable 125. The sensor 105 can be located downhole at a drilling site with the interrogator 120 at the surface of the drilling site. The drilling site may be terrestrial or sea-based. Components of the system 100 may be disposed outside casing in cement or strapped to a production tube in a permanent installation. Components of the system 100 also may be disposed in a coiled tube that can be pushed through into a horizontal area of operation, or a wireline cable that can be tractored into a wellbore using an electrically driven tractor that pulls the wireline cable into the wellbore, or pumped into a wellbore with fluid that push/pulls a cable into the wellbore. The system 100 may be used with other drilling related arrangements. The circuit 110, coupled to the sensor 105, can be structured to be operable to generate a signal correlated to the parameter in response to the measurement by the sensor 105. The circuit 110 may be integrated with the sensor 105. For example, a sensing element 107 may be an integral part of the circuit 110 or directly coupled to a component of the circuit 110. The sensing element 107 may be a diaphragm directly coupled to a component of the circuit 110.

The actuator 115 can be coupled to the circuit 110 to receive the signal generated in response to the measurement by the sensor 105. The signal can be a compensated signal, where a compensated signal is a signal having a characteristic that corresponds to the parameter of interest for which variations in one or more other parameters is substantially corrected or removed, or for which the characteristic is isolated to the parameter of interest. The actuator 115 can be integrated with the circuit 110, integrated with the circuit 110 that is integrated with the sensor 105, or a separate structure coupled to the circuit 110.

The actuator 115 can be structured to be operable to generate a perturbation, based on the signal, to an optical fiber cable 125, that may include one or multiple optical fibers. The actuator 115 can be positioned in proximity to the optical fiber cable 125 at the effective location of the sensor 105. The actuator 115 can be structured to be operable to generate the perturbation to the optical fiber cable 125 with the actuator 115 in contact with the optical fiber cable 125, actuating the cable acoustically. The actuator 115 can be structured to be operable to generate the perturbation to the optical fiber cable 125 with the actuator 115 a distance from the optical fiber 125. The actuator 115 may be realized as a non-contact piezoelectric material, which can provide acoustic pressure to the optical fiber cable 125 rather than transferring vibrations by direct contact.

The optical fiber cable 125 can be perturbed with the optical fiber cable 125 in direct contact with the actuator 115 structured as a vibrator or with the actuator 115 structured having a form of voice coil at a distance away from the optical fiber cable 125. The perturbation of the optical fiber cable can be provided as a vibration of the optical fiber 125 or a strain induced into the optical fiber cable 125. Other perturbations may be applied such that the characteristics of the optical fiber cable are altered sufficiently to affect propagation of light in the optical fiber cable 125. With the effects on the light propagation related to a signal that generates the perturbation, analysis of the effected light propagation can provide data with respect to the signal that generates the perturbation.

The interrogator 120 can be structured to interrogate the optical fiber cable 125 to analyze signals propagating in the optical fiber cable 125. The interrogator 120 can have the capability to couple to the optical fiber cable 125 to receive an optical signal including the effects from the perturbation of the optical fiber cable 125 and to extract a value of the parameter of the measurement in response to receiving the optical signal from the perturbation. In an embodiment, the received signal may be a backscattered optical signal. The interrogator 120 may be structured, for example, to inject a short pulse into the optical fiber cable 125. An example of a short pulse can include a pulse of 20 nanoseconds long. As the pulse travels down the optical fiber cable 125, back-scattered light is generated. Interrogating a location that is one kilometer down the fiber, backscattered light is received after the amount of time it takes to travel one kilometer and then come back one kilometer, which is a round trip time of about ten nanoseconds per meter. The interrogator 120 can include an interferometric arrangement. The interrogator 120 can be structured to measure frequency based on coherent Rayleigh scattering using interferometry, to measure dynamic changes in attenuation, to measure a dynamic shift of Brillouin frequency, or combinations thereof.

The interrogator 120 can be arranged with the optical fiber cable 125 to use an optical signal provided to the interrogator 120 from perturbing the optical fiber cable 125 at a location along the optical fiber cable 125. An arrangement different from using an optical signal backscattered from the perturbation can be utilized. For example, the optical fiber cable 125 can be structured having an arrangement selected from a fiber Bragg grating disposed in the optical fiber cable in vicinity of the actuator, a non-wavelength selective in-line mirror disposed in the optical fiber cable in vicinity of the actuator, intrinsic Fabry-Perot interferometers as a mode of interrogation from fiber Bragg gratings placed apart in the optical fiber cable such that each fiber Bragg grating is in vicinity of a respective actuator, Fizeau sensors in the optical fiber cable, a second optical fiber to transmit an optical signal from a perturbation of the optical fiber cable to a detection unit of the interrogator, or other arrangements to propagate a signal, representative of a measurement, in an optical fiber cable to an interrogation unit to analyze the signal to extract a value of a parameter that is the subject of the measurement.

Figure 2:
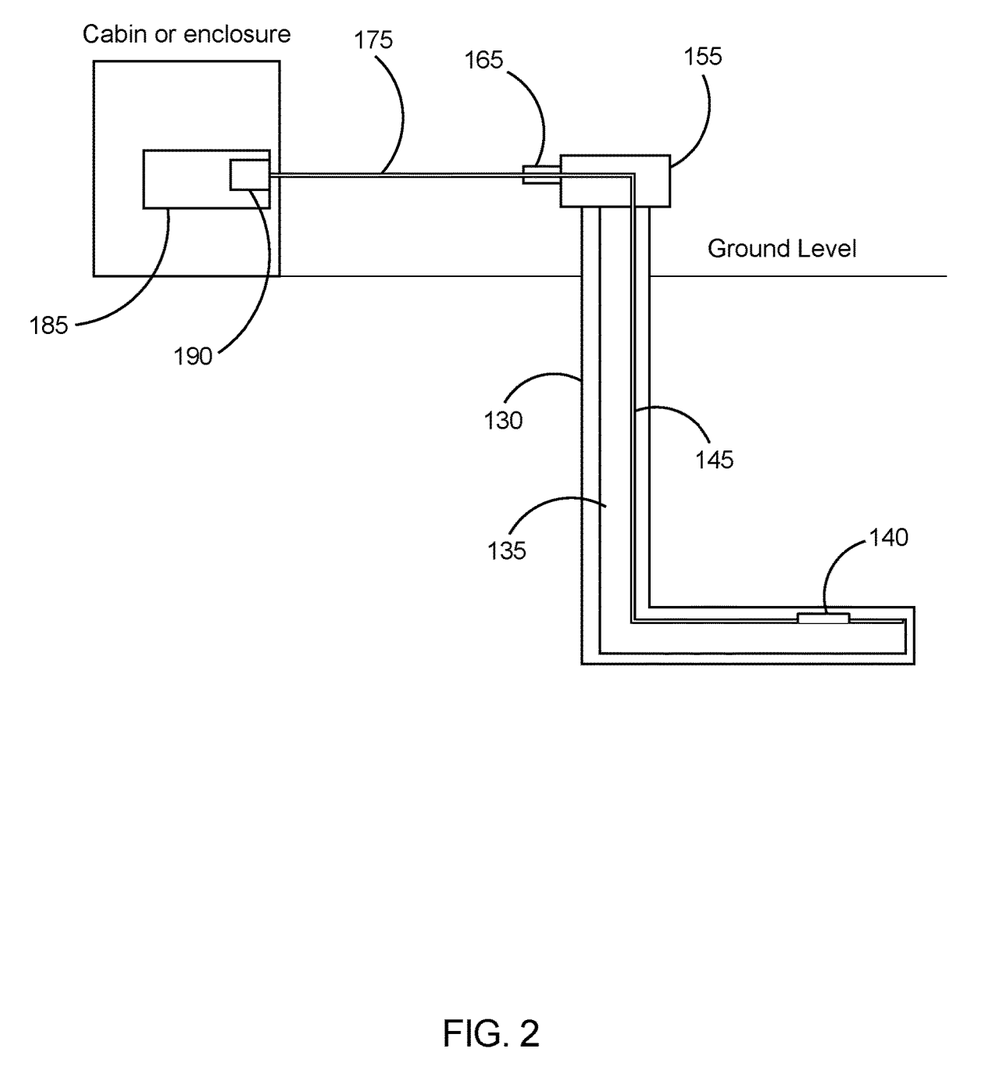
FIG. 2 illustrates a more complete system for utilizing electro acoustic technology in a subsurface well.

FIG. 2 expands on the use of electro acoustic technology (EAT) sensing systems by illustrating a more complete system. A subsurface well 130 is illustrated, in which a production casing 135 is shown extending through the well. In some applications the production casing may be non-metallic. At the far downhole end of the well an electro acoustic technology sensor assembly 140 is shown. In this example it is shown on the outside of the casing. In some applications the EAT sensor assembly could be within the casing. In many applications there could be multiple EAT sensor assemblies and the technology can easily accommodate that. In close proximity to the EAT sensor assembly shown is a fiber optic cable 145 that is deployed all through the well and back to the surface, then through a wellhead 155. The fiber optic cable 145 may be clamped to the EAT sensor assembly 140 to ensure good transmission of signals. The fiber optic cable 145 exits through a wellhead exit 165 and is connected using a surface fiber cable 175 within an outdoor cabin or enclosure to a Distributed Acoustic System (DAS) interrogator 185. The interrogator may then have a laser source 190 that fires interrogation pulses down through the fiber optic cable and receives backscattered light back from the fiber optic cable.

The fiber optic cable 145 may be permanently installed, or in some applications could be attached to some type of logging cable such as wireline or slickline cables. It could also be clamped on tubing inside the casing 135 in some applications.

The possible advantages from using the above described EAT systems in a variety of configurations may include using a variety of sensors, either electrical or fiber optic based, to measure for example a chemical concentration, a pH, a temperature, or a pressure and using a common optical fiber cable connected to a surface interrogator to measure perturbation signals from each EAT sensor location distributed along that common optical fiber cable and analyzing those signals to extract values of the parameters being measured. The approach can significantly reduce manufacturing complexity, reduce very expensive labor intensive production with expensive equipment like splicers and fiber winders, improve reliability, and widen industry acceptance by allowing the use of sensing technologies of choice. The combination of the EAT technology a Doppler based flow sensor in bridge plugs will now be described.

Doppler Flow Measurements and Electro Acoustic Technology

Frequently in the drilling of subsurface wells, there is a need to isolate zones within the well. Creating seals within the wellbore or casing does this. A common approach is the use of bridge plugs. In hydraulic fracturing bridge plugs are often used to isolate perforations in one portion of the well from perforations in another portion. The use of bridge plugs makes it possible to place sensors in the bridge plug. Disclosed herein is a proposal to place Doppler based flow sensors along with other needed sensors within bridge plugs.

Figure 3:
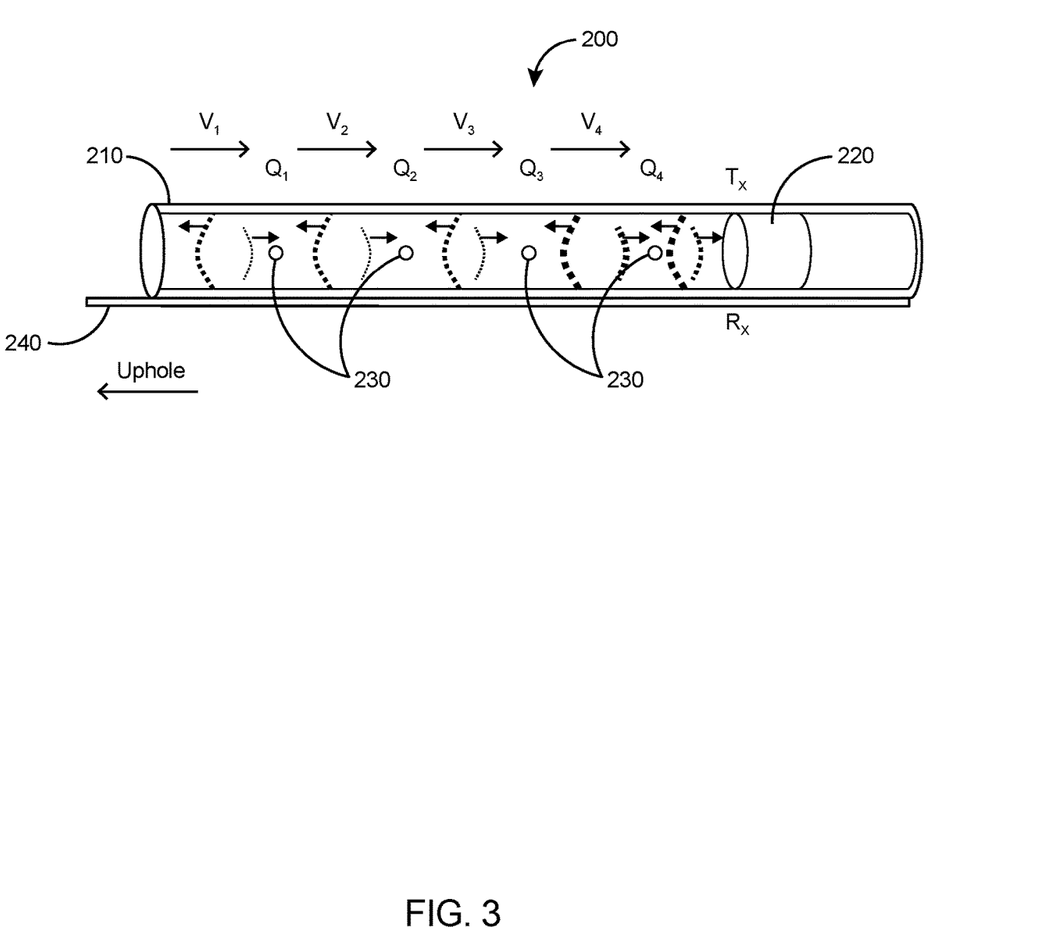
FIG. 3 illustrates flow during a fracturing operation in a perforated section of cemented well with a fiber optic cable outside the casing with a bridge plug and Doppler based flow sensor.

FIG. 3, shown generally as 200, show a section of a cemented well with a fiber optic cable 240 outside the casing 210 (cement and formation not shown). A bridge plug 220 with a Doppler based flow sensor has been placed, and the stage has been perforated. The perforations are shown at the locations 230. Fluid is pumped from the surface with a velocity $V_1$ and volume $Q=Q_1+Q_2+Q_3+Q_4$ where volume $Q_1$ enters the first perforation, volume $Q_2$ enters the second perforation etc. The fluid velocity after a perforation drops when a volume of fluid enters the perforation. The fluid velocity before the second perforation may then be $V_2$, the fluid velocity before the third perforation may then be $V_3$ etc. It is desirable to know both the instantaneous fluid flow as well as the cumulative fluid flows into each perforation.

The Doppler sensor may transmit a high frequency pulse up-hole (left arrows), and there may be reflections off the fluid and/or proppant that may cause some of the high frequency pulse to reflect back down-hole (right arrows) towards the receiver in the bridge plug. The reflected acoustic waves may be Doppler shifted and the Doppler shift may be proportional to the velocity of the elements causing the reflections. The bulk flow can be determined by measuring the Doppler shift.

The speed of sound travelling through water is directly proportional to the density of water, and parameters that change the density are:
  Turbidity—amount of sediment or proppant in suspension.
  Salinity—amount of substance (salt, guar, etc) dissolved in water.
  Temperature
  Pressure The electrical signals from the Doppler sensor are converted to acoustic signals using the electro acoustic technology described earlier. This may be done in a number of ways. Exemplary examples might include the use of an analog-to digital converter to generate an acoustic signal correlated with the Doppler measurement. The electro acoustic technology might include piezo electric components that vibrate to convey acoustic signals. The optical fiber cable 240, which can be interrogated from the surface by a DAS interrogator 185 such as the one illustrated in FIG. 2, can then pick up these acoustic signals. As described earlier, electro acoustic technology enables the use of many different frequency bands to transmit digital information over one fiber optic cable.

The locations of the perforations are well known as the DAS fiber optic system can be used to accurately detect perforation locations. Additional sensors measuring temperature, pressure, and chemical properties of the fluid can also be added to the bridge plugs and that data can be used to refine the estimates of the Doppler based flow sensor because as disclosed earlier these variables influence the density of water, and the speed of sound traveling through water. With all of these variables being measured the system described is well constrained, and the amount of proppant can therefore be determined at any given location as a function of the measured travel time given that the perforation hole distances are known.

Figure 4:
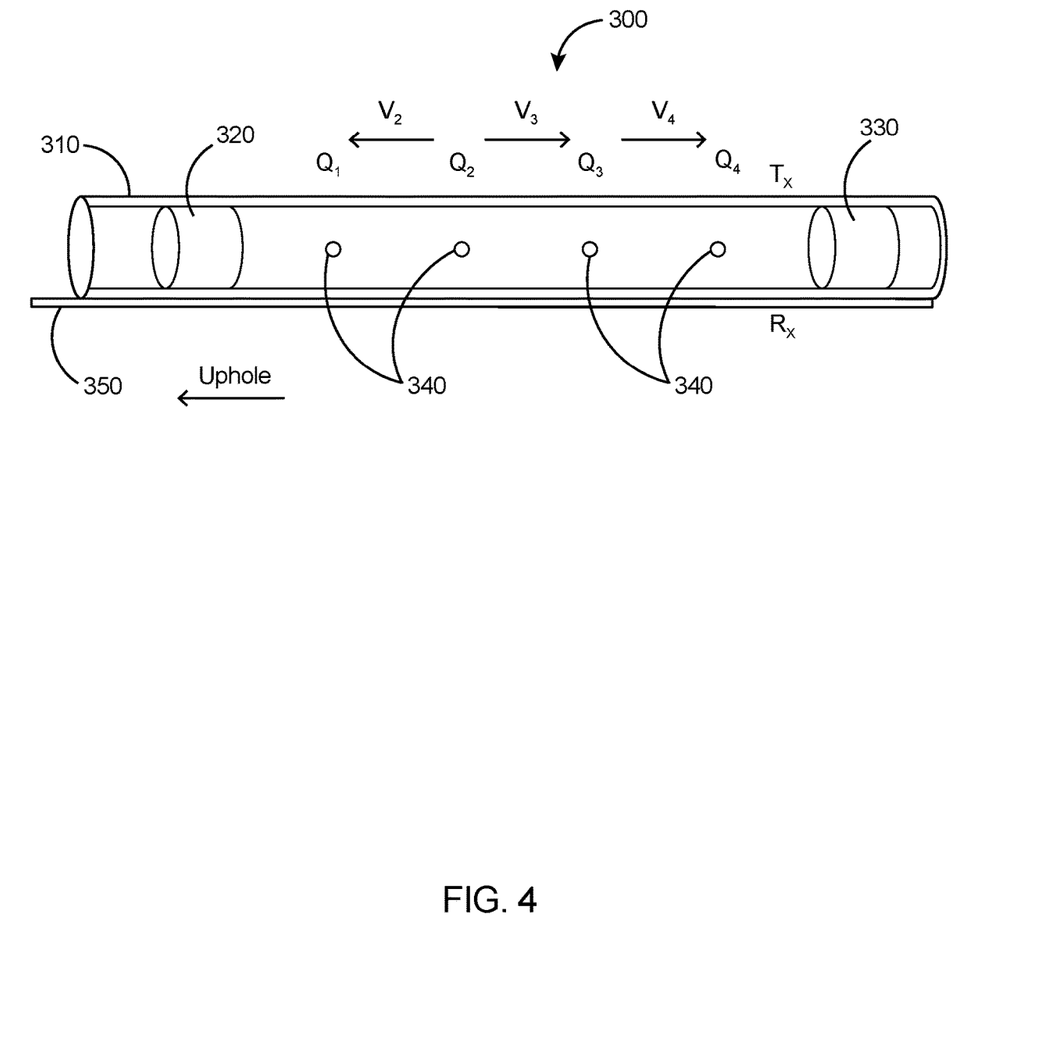
FIG. 4 illustrates cross flow after a fracturing stage has been completed and the next bridge plug has been placed.

The system can also be used to measure cross flow after a stage has been completed and the next bridge plug has been placed as illustrated in FIG. 4.

In FIG. 4, shown generally as 300, a second bridge plug 320 is shown uphole from a previous bridge plug 330 and above the upper most perforation of the four perforations 340 when the next stage is perforated. There may be cross flow within the stage at that point if some perforations have taken more fluid and/or have contacted reservoir layers with different pressure. The example illustrated show a scenario where the pressure in the second perforation is higher and fluid flows from the second perforation towards the first and third perforation. The Doppler flow sensing system will be able to capture the fluid flow and thereby the volumes, and allow a more accurate model of where fluids have entered. Because the Doppler flow meter sensor can detect both the fluid velocities and their location and the electro acoustic technology device can transmit that information back to the surface via the fiber optic cable this approach can identify and measure any combinations of cross flows in any cluster of perforations, all in real time.

Although many types of Doppler flow meters can be used in this application, and they are all anticipated, many operate in the MHz range, and the sensors used in this application may operate at lower frequencies given that the distance in the fluid may be significantly longer than the distances used in e.g. ultra-sound Doppler sensors. Commercial echo sounders often operate in the 10's of kHz to 100's of kHz. Narrow beam transducers would most likely be the desired type of transducers given that the casing is a very narrow and long object.

Noise might be a problem during the fracture treatment, but since the bridge plug is not next to any of the perforation clusters, noise should be a minimal problem unless there is a leak at the plug. Some emphasis on error checking and correction and communication schemes can minimize this problem.

The most significant problem will be packaging and survivability of the sensor unit since it will be exposed to high pressure and some bridge plugs are set with an explosive charge. The package would contain the sensor, battery or other power source, A/D (with whatever amplification, signal conditioning, etc. needed), and device for generating acoustic energy at discrete frequencies to communicate with the DAS fiber. This would be the electro acoustic technology (EAT) device.

Distinctive Features of the Disclosed Technology

The combination of a bridge plug as the carrier for a Doppler flow sensor and the DAS fiber in conjunction with electro acoustic technology for the communications is a major step forward. Having the flow sensing unit in the bridge plug allows for reasonable energy storage media since it only needs to be powered for hours or a few days rather than weeks. Having a flow sensor in every bridge plug allows for observation of each stage fracturing, each stage shut in, isolation issues if they occur, possible communication during zipper fracturing, and much more. Multiple stages can be monitored at the same time.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system for obtaining downhole flow rates and proppant concentrations between perforations during hydraulic fracturing comprising:
    at least one bridge plug deployed down hole in a casing with one or more perforations in the casing above the at least one bridge plug;
    a Doppler based flow meter sensor installed in the at least one bridge plug, wherein the Doppler based flow meter sensor is configured to emit a Doppler signal uphole and to detect reflections of the Doppler signal off fluid used for hydraulic fracturing;
    an electro acoustic technology acoustic signal generator installed in the at least one bridge plug; and
    a fiber optic cable installed on the outside of the casing that is part of a distributed acoustic sensing (DAS) system connected to a surface distributed acoustic sensing interrogator.

2. The system of claim 1 further comprising additional sensors installed in the at least one bridge plug measuring temperature, pressure and fluid chemical properties.

3. The system of claim 1 wherein the Doppler based flow meter sensor and the electro acoustic technology acoustic signal generator are powered by at least one battery.

4. The system of claim 1 wherein the Doppler flow meter sensor operates in a frequency range between 10 and 500 kHz.

5. The system of claim 1, wherein the electro acoustic technology acoustic signal generator is configured to generate perturbations, based on the detected reflections for transmission along the fiber optic cable.

6. The system of claim 5, wherein the surface distributed acoustic sensing interrogator is configured to detect the perturbations along the fiber optic cable.

7. The system of claim 6, wherein the surface distributed acoustic sensing interrogator is configured to determine a flow rate of the fluid based on the perturbations received by the surface distributed acoustic sensing interrogator.

8. The system of claim 7, wherein the flow rate of the fluid is determined based on a shifted frequency of the Doppler signal from the reflections.

9. The system of claim 6, wherein the surface distributed acoustic sensing interrogator is configured to determine a chemical concentration of the fluid based on the perturbations received by the surface distributed acoustic sensing interrogator.

10. The system of claim 9, wherein the chemical concentration is determined based on an amplitude of the Doppler signal from the reflections.

11. A method for obtaining downhole flow rates and proppant concentrations between perforations during hydraulic fracturing comprising:
    providing at least one bridge plug down hole in a casing with one or more perforations in the casing above the at least one bridge plug;
    providing a Doppler based flow meter sensor in the at least one bridge plug and generating Doppler based flow meter sensor data with the sensor;
    providing an electro acoustic technology acoustic signal generator installed in the at least one bridge plug to generate perturbations representing the Doppler based flow meter sensor data;
    generating perturbations representing the Doppler based flow meter sensor data;
    providing a distributed acoustic sensing (DAS) system comprising: a surface distributed acoustic sensing interrogator, and a fiber optic cable installed on the outside of the casing and connected to the surface distributed acoustic sensing interrogator;
    receiving and optically transferring the perturbations through the fiber optic cable to the surface distributed acoustic sensing interrogator; and
    determining, from the perturbations, a flow rate and a proppant concentration of a fluid used for hydraulic fracturing.

12. The method of claim 11 further comprising: providing additional sensors installed in the at least one bridge plug measuring temperature, pressure and fluid chemical properties.

13. The method of claim 12 wherein the measured temperature, pressure, and fluid chemical properties are used to adjust the Doppler based flow meter sensor data.

14. The method of claim 11, wherein determining the flow rate of the fluid comprises:
    deriving the flow rate of the fluid from a shifted frequency of the Doppler based flow meter sensor data.

15. The method of claim 11, wherein determining the proppant concentration of the fluid comprises:
    deriving the chemical concentration of the fluid from an amplitude of the Doppler based flow meter sensor data.

16. A method comprising:
    positioning a bridge plug downhole into a borehole having a casing, wherein the bridge plug includes a Doppler based flow meter sensor;
    positioning a fiber optic cable on the outside of the casing;
    coupling the fiber optic cable to a surface acoustic sensing interrogator;
    perforating the casing above the bridge plug;
    pumping fluid from the surface down the borehole;
    emitting, from the Doppler based flow meter sensor in the bridge plug uphole, a Doppler signal;
    detecting, by the Doppler based flow meter sensor, reflections of the Doppler signal off the fluid;
    transmitting, along the fiber optic cable to the surface acoustic sensing interrogator, perturbations representative of the reflections of the Doppler signal; and
    determining a flow rate of the fluid based on the perturbations.

17. The method of claim 16, wherein determining the flow rate of the fluid comprises:

deriving the flow rate of the fluid from a shifted frequency of the Doppler signal from the reflections.

18. The method of claim 16, further comprising:
determining a chemical concentration of the fluid based on the perturbations.

19. The method of claim 18, wherein determining the chemical concentration comprises:
deriving the chemical concentration of the fluid from an amplitude of the Doppler signal from the reflections.

* * * * *